United States Patent
Tsirkin

(10) Patent No.: US 10,324,743 B2
(45) Date of Patent: Jun. 18, 2019

(54) ANNOUNCING VIRTUAL MACHINE MIGRATION

(71) Applicant: Red Hat Israel, Ltd., Raanana (IL)

(72) Inventor: Michael Tsirkin, Yokeneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 137 days.

(21) Appl. No.: 14/469,691

(22) Filed: Aug. 27, 2014

(65) Prior Publication Data

US 2016/0062779 A1 Mar. 3, 2016

(51) Int. Cl.
*G06F 9/50* (2006.01)
*G06F 9/455* (2018.01)

(52) U.S. Cl.
CPC ............ *G06F 9/45558* (2013.01); *G06F 9/50* (2013.01); *G06F 2009/4557* (2013.01); *G06F 2009/45575* (2013.01)

(58) Field of Classification Search
CPC ............. G06F 9/45533; G06F 9/45558; G06F 9/4806; G06F 9/4843; G06F 9/485; G06F 9/4856; G06F 9/5083; G06F 9/5088; G06F 2009/4557; G06F 2009/45575
USPC ...................................................... 718/1, 105
See application file for complete search history.

(56) References Cited

U.S. PATENT DOCUMENTS

| | | | | |
|---|---|---|---|---|
| 5,526,489 A * | 6/1996 | Nilakantan | ............. | H04L 29/06 340/9.14 |
| 7,249,227 B1 * | 7/2007 | Pittman | ................. | G06F 3/0611 711/154 |
| 8,190,769 B1 | 5/2012 | Shukla et al. | | |
| 8,331,362 B2 | 12/2012 | Shukla et al. | | |
| 8,396,986 B2 * | 3/2013 | Kanada | .................. | G06F 9/4856 709/238 |
| 8,606,890 B2 | 12/2013 | Hadas et al. | | |
| 8,671,238 B2 * | 3/2014 | Mashtizadeh | ....... | G06F 9/45558 711/149 |
| 8,683,047 B2 * | 3/2014 | Han | ........................ | H04W 4/02 709/227 |
| 8,949,431 B2 * | 2/2015 | Bercovici | ........... | G06F 9/45533 709/226 |
| 9,137,052 B2 * | 9/2015 | Koponen | ................. | H04L 12/66 |
| 9,282,039 B2 * | 3/2016 | Zhang | ...................... | H04L 12/56 |
| 9,323,566 B2 * | 4/2016 | Hatta | ......................... | G06F 9/54 |
| 2005/0102671 A1 * | 5/2005 | Baumberger | ............ | G06F 9/546 718/1 |

(Continued)

OTHER PUBLICATIONS

Silvera, E., et al., IP Mobility to Support Live Migration of Virtual Machines Across Subnets, Proceedings of SYSTOR 2009: The Israeli Experimental Systems Conference, Article No. 13, 2009, 10 pages, [retrieved on Nov. 14, 2015], Retrieved from the Internet: <URL:http://dl.acm.org/>.*

(Continued)

*Primary Examiner* — Geoffrey R St Leger
(74) *Attorney, Agent, or Firm* — Lowenstein Sandler LLP

(57) ABSTRACT

Systems and methods for announcing virtual machine migration. An example method may comprise: receiving, by a first hypervisor running on a first computer system, a migration announcement from a virtual machine that is undergoing live migration from the first computer system to a second computer system; and transmitting a message comprising the migration announcement to a second hypervisor running on the second computer system.

19 Claims, 5 Drawing Sheets

(56) References Cited

U.S. PATENT DOCUMENTS

| | | | | |
|---|---|---|---|---|
| 2008/0163239 | A1* | 7/2008 | Sugumar | G06F 9/5088 718/105 |
| 2010/0017519 | A1* | 1/2010 | Han | H04W 4/02 709/227 |
| 2011/0246669 | A1* | 10/2011 | Kanada | G06F 9/4856 709/238 |
| 2012/0017031 | A1* | 1/2012 | Mashtizadeh | G06F 9/45558 711/6 |
| 2012/0033673 | A1* | 2/2012 | Goel | H04L 49/70 370/400 |
| 2012/0195187 | A1* | 8/2012 | Ashihara | G06F 9/46 370/220 |
| 2013/0044641 | A1* | 2/2013 | Koponen | H04L 12/66 370/255 |
| 2013/0054813 | A1* | 2/2013 | Bercovici | G06F 9/45533 709/226 |
| 2013/0086582 | A1* | 4/2013 | Cardona | H04L 69/12 718/1 |
| 2013/0198352 | A1* | 8/2013 | Kalyanaraman | H04L 67/34 709/223 |
| 2013/0198355 | A1* | 8/2013 | Kalyanaraman | H04L 67/34 709/223 |
| 2013/0315246 | A1* | 11/2013 | Zhang | H04L 12/56 370/392 |
| 2014/0019621 | A1 | 1/2014 | Khan et al. | |
| 2014/0115584 | A1 | 4/2014 | Mudigonda et al. | |
| 2014/0208049 | A1* | 7/2014 | Furusawa | G06F 3/0647 711/162 |
| 2014/0344424 | A1* | 11/2014 | Sato | G06F 9/4856 709/221 |
| 2015/0121372 | A1* | 4/2015 | Hatta | G06F 9/54 718/1 |
| 2015/0135173 | A1* | 5/2015 | Bacher | G06F 9/45558 718/1 |
| 2015/0277953 | A1* | 10/2015 | Xu | G06F 9/45558 718/1 |
| 2016/0026489 | A1* | 1/2016 | Maislos | G06F 9/45558 718/1 |

OTHER PUBLICATIONS

Nicolae, B., et al., A hybrid local storage transfer scheme for live migration of I/O intensive workloads, Proceedings of the 21st international symposium on High-Performance Parallel and Distributed Computing, 2012, pp. 85-96, [retrieved on Jan. 19, 2019], Retrieved from the Internet: <URL:http://dl.acm.org/>.*

Zhang, J., Flexible Distributed Computing with Volunteered Resources, Dissertation, School of Electronic Engineering and Computer Science, Queen Mary, University of London, Jun. 2010, 201 pages, [retrieved on Jul. 17, 2018], Retrieved from the Internet: <URL:https://qmro.qmul.ac.uk/xmlui/handle/123456789/358>.*

"How Does Migrating a Running Virtual-Machine From One Hypervisor to Another Actually Work?", Serverfault.com, 2 pages http://serverfault.com/questions/591647/how-does-migrating-a-running-virtual-machine-from-one-hypervisor-to-another-actu (Last accessed Accessed Sep. 10, 2014).

"Migration", KVM.org, 5 pages http://www.linux-kvm.org/page/Migration (Last accessed Sep. 10, 2014).

Li, Y., "Problem Statement on Address Resolution in Virtual Machine Migration Draft-Liys-Armd-vm-Migration-ps-00.txt", Huawei Technologies, Oct. 18, 2010, 9 pages http://tools.ietf.org/html/draft-liyz-armd-vm-migration-ps-00.

* cited by examiner

| 210 Hardware type | 212 Protocol type | 214 Operation code | 216 Source Hardware Address | 218 Source Protocol Address | 220 Target Hardware Address | 222 Target Protocol Address |

FIG. 2

ANNOUNCING VIRTUAL MACHINE MIGRATION

TECHNICAL FIELD

The present disclosure is generally related to virtualized computer systems, and is more specifically related to systems and methods for announcing virtual machine migration.

BACKGROUND

Virtualization may be viewed as abstraction of some physical components into logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines in order to improve the hardware utilization rate. Virtualization may be achieved by running a software layer, often referred to as "hypervisor," above the hardware and below the virtual machines. A hypervisor may run directly on the server hardware without an operating system beneath it or as an application running under a traditional operating system. A hypervisor may abstract the physical layer and present this abstraction to virtual machines to use, by providing interfaces between the underlying hardware and virtual devices of virtual machines. Processor virtualization may be implemented by the hypervisor scheduling time slots on one or more physical processors for a virtual machine, rather than a virtual machine actually having a dedicated physical processor. Memory virtualization may be implemented by employing a page table (PT) which is a memory structure translating virtual memory addresses to physical memory addresses.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates an example structure of a migration announcement that may be transmitted by the destination hypervisor to announce the new location of a virtual machine undergoing live migration, in accordance with one or more aspects of the present disclosure;

DETAILED DESCRIPTION

Figure 1:
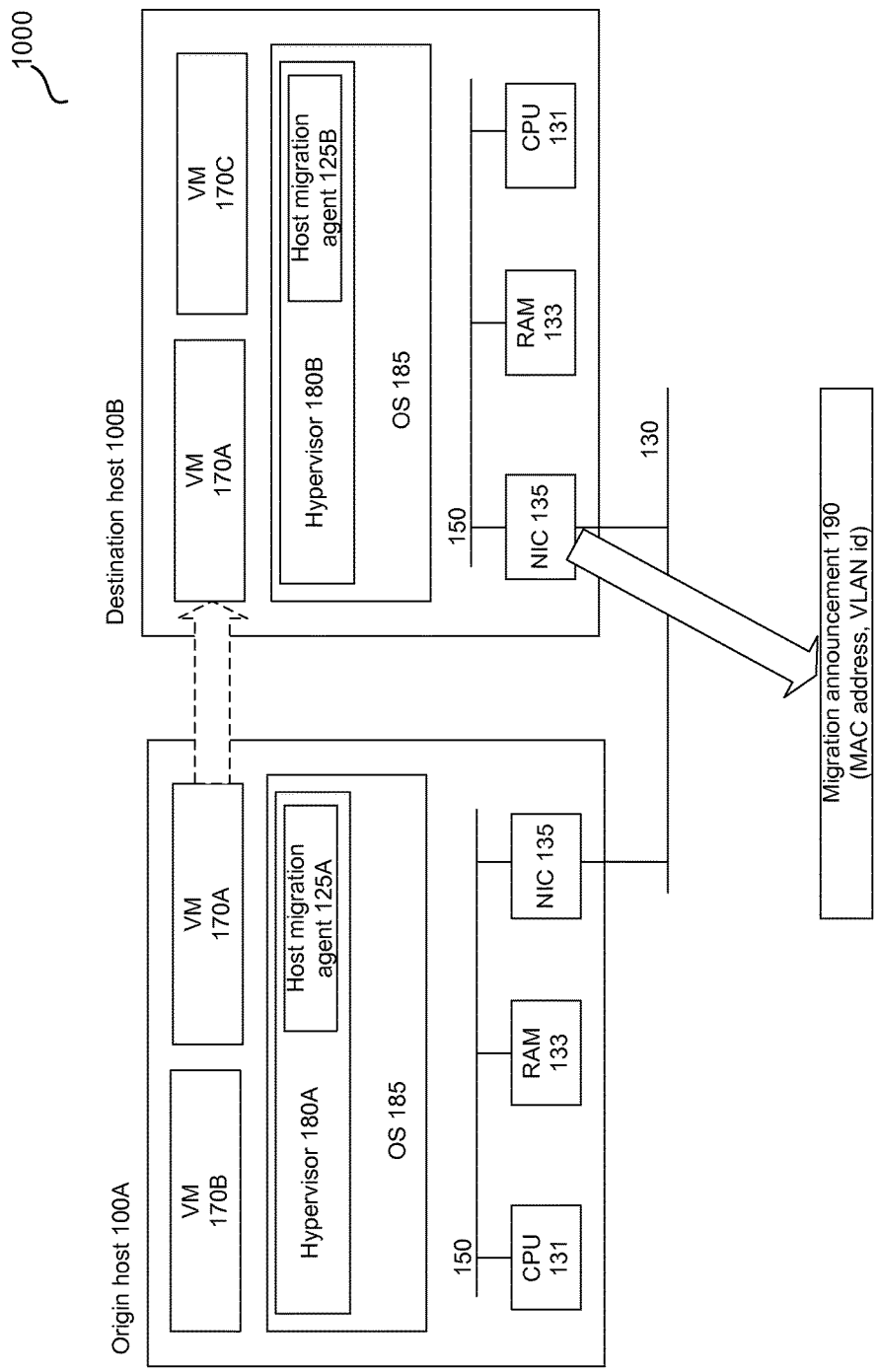
FIG. 1 depicts a high-level component diagram of one illustrative embodiment of a distributed computer system in accordance with one or more aspects of the present disclosure.

Described herein are methods and systems for announcing virtual machine migration. In the following description and examples, references are made to Open Systems Interconnection (OSI) model layers, including data link layer (layer 2) and network layer (layer 3), as defined by Recommendation X.200 (07/94) by International Telecommunications Union (ITU). A "frame" herein shall refer to a unit of transmission in a data link layer protocol, including a link-layer header followed by a data packet. The data link layer provides local delivery of frames between devices on the same local area network (LAN). Functions of data link layer protocols include local delivery, addressing, and media arbitration. Examples of data link protocols include Ethernet, Infiniband, or Wi-Fi. The network layer provides the functional and procedural means of transferring variable-length data sequences from an origin host to a destination host via one or more networks, while maintaining the quality of service functions. Functions of network layer protocols include host addressing and message forwarding.

"Live migration" herein refers to the process of moving a running virtual machine from an origin host computer system to a destination host computer system without disrupting the guest operating system and the applications executed by the virtual machine. Live migration may involve copying the virtual machine execution state from the origin host to the destination host. The virtual machine execution state may comprise the memory state, the virtual processor state, the virtual devices state, and/or the network connectivity state.

In an illustrative example, a migration agent may copy the execution state of the virtual machine being migrated, including a plurality of memory pages, from the origin host to the destination host while the virtual machine is still running at the origin host. Upon substantially completing the virtual machine state copying, the migration agent may stop the virtual machine execution at the origin host and resume the virtual machine at the destination host. Upon successful migration, the destination host may broadcast a message announcing the new location of the virtual machine, so that the network communications of the virtual machine would continue without interruption.

In accordance with one or more aspects of the present disclosure, the origin hypervisor may receive a migration announcement transmitted by a virtual machine undergoing live migration. The migration announcement may comprise a data link layer address (e.g., a MAC address) associated with a virtual network interface of the virtual machine. In certain implementations, the migration announcement may further comprise a VLAN identifier associated with the virtual network interface. A virtual machine having two or more virtual network interfaces may transmit two or more migration announcements, each migration announcement corresponding to the respective virtual network interface.

Responsive to receiving the migration announcement originated by the virtual machine, the origin hypervisor may forward it to the destination hypervisor within a message transmitted over a network. In certain implementations, the migration announcement may be stored within a memory mapped into the virtual machine address space, and thus may be transmitted to the destination hypervisor as part of the virtual machine state transmission.

Responsive to receiving the migration announcement, the destination hypervisor may broadcast the migration announcement over the network. In certain implementations, the destination hypervisor may append one or more data link layer and/or network layer headers to the body of the migration announcement that has been received from the origin hypervisor, as described in more details herein below. In certain implementations, the migration announcement transmitted by the destination hypervisor may conform to a Reverse Address Resolution Protocol (RARP) defined in Finlayson, R., Mann, T., Mogul, J., and M. Theimer, "*A Reverse Address Resolution Protocol*", STD 38, RFC 903, June 1984.

In certain implementations, the migration announcement may be repeatedly broadcasted by the destination hypervisor to ensure that the announcement has been successfully received by all interested parties.

In certain implementations, the migration announcement may be broadcasted by the destination hypervisor before the virtual machine is restarted at the destination host, to ensure uninterrupted network communications by the virtual machine after it has been restarted.

Responsive to receiving the announcement, one or more data link layer devices (such as Ethernet switches and/or bridges) may associate the data link layer address and the switch port through which the announcement has been received. In certain implementations, one or more data link layer devices may further associate the port through which the announcement has been received and one or more virtual local area networks (VLANs) identified by the announcement.

Various aspects of the above referenced methods and systems are described in details herein below by way of examples, rather than by way of limitation.

FIG. 1 depicts a high-level component diagram of one illustrative example of a distributed computer system 1000 comprising host computer systems 100A, 100B in accordance with one or more aspects of the present disclosure. "Computer system" herein shall refer to a system comprising one or more processors, one or more memory devices, and one or more input/output (I/O) interfaces. "Distributed computer system" herein shall refer to a system comprising two or more computer systems interconnected by one or more communication networks.

In the illustrative example of FIG. 1, host computer systems 100A and 100B may be interconnected via a network 130. Each host computer system 100A, 100B may comprise one or more processors 131 communicatively coupled to a memory device 133 and a network interface controller (NIC) 135. Local connections within host computer system 100, including connections between processor 131, memory device 133, and NIC 135, may be provided by one or more local buses 150 of a suitable architecture.

"Processor" or "processing device" herein refers to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

"Memory device" herein refers to a volatile or non-volatile memory device, such as RAM, ROM, EEPROM, or any other device capable of storing data.

"I/O device" herein refers to a device capable of providing an interface between a processor and an external device capable of inputting and/or outputting binary data.

"Network interface controller" (NIC) herein refers to a computer hardware component that connects a computer to a computer network. A NIC may comprise electronic circuitry required to communicate with other networked devices using specific physical layer and data link layer standards.

In the illustrative example of FIG. 1, each host computer system 100 may run multiple virtual machines 170 by executing a software layer 180, often referred to as "hypervisor," above the hardware and below the virtual machines. In certain implementations, hypervisor 180 may be a component of operating system 185 executed by the corresponding host computer system 100. Alternatively, hypervisor 180 may be provided by an application running under host operating system 185, or may run directly on the corresponding host computer system 100 without an operating system beneath it. Hypervisor 180 may abstract the physical layer, including processors, memory, and I/O devices, and present this abstraction to virtual machines 170 as virtual devices, including virtual processors, virtual memory, and virtual I/O devices. Host migration agents 125A, 125B running on the respective host computer system 100A, 100B may perform virtual machine migration management functions in accordance with one or more aspects of the present disclosure. In certain implementations, a host migration agent may be implemented as a software component invoked by hypervisor 180. Alternatively, functions of host migration agent 125 may be performed by hypervisor 180.

In the illustrative example of FIG. 1, virtual machine 170A may be undergoing live migration from origin host computer system 100A to destination host computer system 100B. Live migration may involve copying the virtual machine execution state from the origin host to the destination host. The virtual machine execution state may comprise the memory state, the virtual processor state, the virtual devices state, and/or the connectivity state. Host migration agent 125A may manage copying, over network 130, the execution state of migrating virtual machine 170A, from origin host 100A to destination host 100B while virtual machine 170A is still running on origin host 100A.

In an illustrative example, migration agent 125A may copy the execution state of virtual machine 170A from origin host 100A to destination host 100B while virtual machine 170A is still running at origin host 100A. Origin hypervisor 180A may receive a migration announcement message from virtual machine 170A undergoing live migration.

The migration announcement may comprise a data link layer address (e.g., a MAC address) associated with virtual network interface 135 of virtual machine 170A. In certain implementations, the migration announcement may further comprise a VLAN identifier associated with virtual network interface 135. In an illustrative example, VLAN identifiers associated with one or more virtual network interfaces 135 of virtual machine 170A may conform to IEEE 802.1Q standard defining defines a system of VLAN tagging for Ethernet frames and procedures to be followed by data link layer devices (bridges and switches) in handling such frames. In an illustrative example, a VLAN identifier may be provided by a 32-bit field inserted between the source MAC address and the EtherType/length fields of the original Ethernet frame.

A virtual machine having two or more virtual network interfaces may transmit two or more migration announcements. Each migration announcement may correspond to the respective virtual network interface.

Responsive to receiving the migration announcement from virtual machine 170A, origin hypervisor 180A may forward the migration announcement to destination hypervisor 180B within a message transmitted over network 130. In an illustrative example, the migration announcement may be stored in a memory location which is mapped into the address space of virtual machine 170A, and thus may be transmitted to the destination hypervisor as part of the virtual machine state transmission.

Responsive to receiving the migration announcement from origin hypervisor 180A, destination hypervisor 180B may re-transmit the migration announcement 190 to a plurality of recipients residing on network 130, in order to ensure successful delivery of data link layer frames addressed to virtual machine 170A residing at destination host 100B. In certain implementations, destination hypervisor 180B may append one or more data link layer and/or network layer headers to the body of the migration announcement that has been received from the origin hypervisor, as described in more details herein below.

FIG. 2 schematically illustrates an example structure of a migration announcement that may be transmitted by the destination hypervisor to announce the new location of a virtual machine, in accordance with one or more aspects of the present disclosure. In the illustrative example of FIG. 2, the migration announcement may comprise a RARP "Request Reverse" message (operation code=3). Message 200 may comprise hardware type field 210, protocol type field 212, and operation code field 214. Message 200 may further comprise source hardware address 216 and source protocol address 218 fields. Message 200 may further comprise target hardware address 220 and target protocol address 222 fields. Message 200 may further comprise other fields that are not shown in FIG. 2 for clarity and conciseness.

In certain implementations, the destination hypervisor may initialize hardware type field 210 with the value identifying Ethernet networks, protocol type field 212 with the value identifying RARP, and operation code field with the value identifying RARP "Request Reverse" message. The destination hypervisor may further initialize source hardware address 216 and target hardware address fields 220 with the data link layer address of a virtual network interface of virtual machine 170A. The destination hypervisor may further initialize source protocol address 218 and target protocol address fields 222 with the network layer address assigned to the virtual network interface of virtual machine 170A.

The destination hypervisor may then transmit the migration announcement to a broadcast network layer address. Alternatively, the announcements may be addressed to a unicast or multicast address, based on the configuration of network 130 to which host computer system 100B is connected.

In certain implementations, the migration announcement may be repeatedly transmitted by the destination hypervisor two or more times, to ensure that it has successfully been received by all interested parties. The number and frequency of such transmissions may be configurable based on the requirements imposed by network 130 to which host computer system 100B is connected.

In certain implementations, the migration announcement message may be broadcasted by destination hypervisor 180B before virtual machine 170A is restarted at destination host 100B, to ensure uninterrupted network communications by virtual machine 170A after it has been restarted. In an illustrative example, the migration announcement message may be broadcasted by destination hypervisor 180B after virtual machine 170A has been stopped at source host 100A.

In certain implementations, the destination hypervisor may broadcast two or more migration announcements for a virtual machine having two or more virtual network interfaces. Each migration announcement may correspond to the respective virtual network interface.

Responsive to receiving a migration announcement, one or more data link layer devices (such as Ethernet switches and/or bridges) may update their respective internal data structures employed for data link layer frame forwarding, to reflect the new location of the network interface associated with the data link layer address specified by the announcement.

Figure 3:
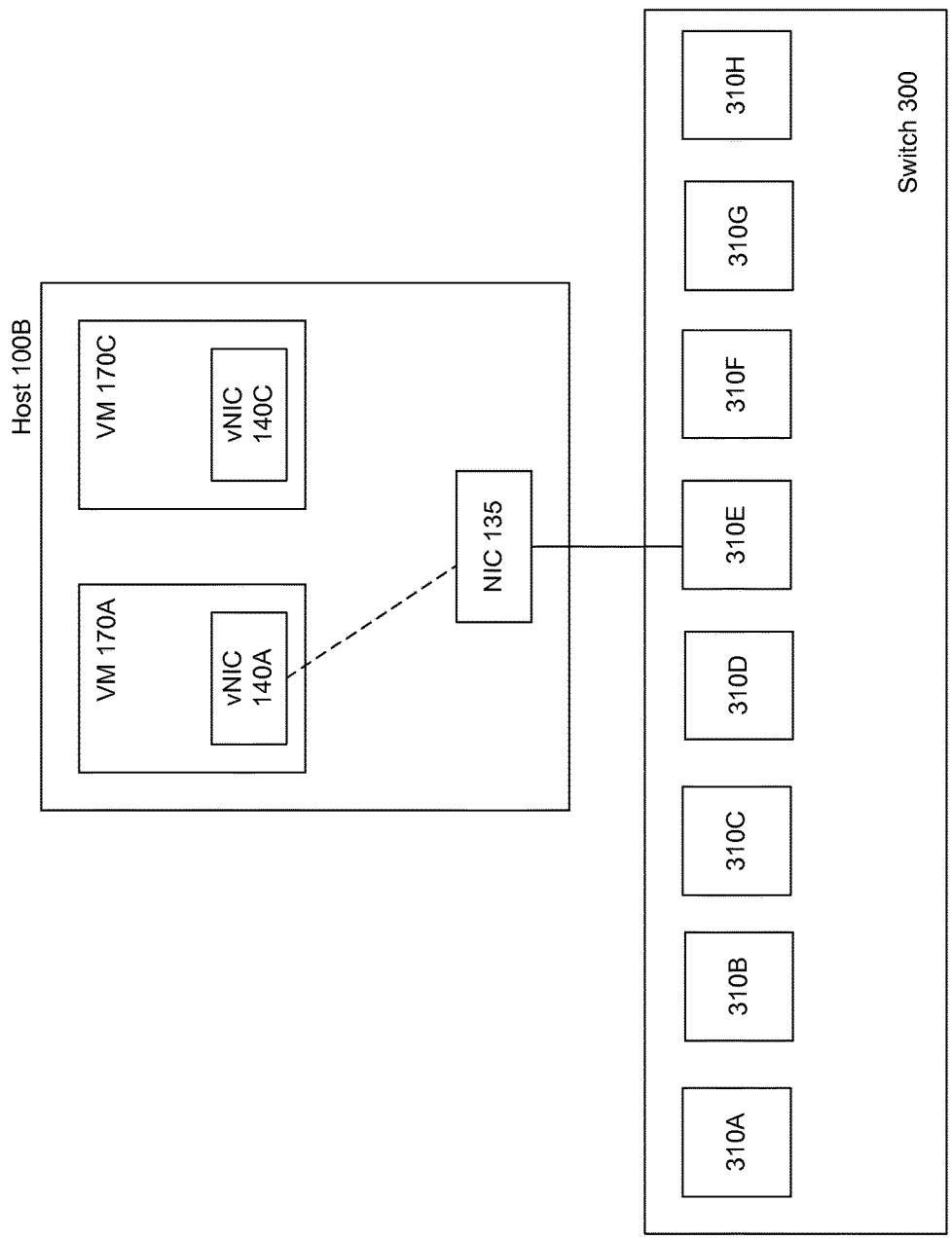
FIG. 3 schematically illustrates an Ethernet switch receiving a virtual machine migration announcement, in accordance with one or more aspects of the present disclosure.

FIG. 3 schematically illustrates an Ethernet switch receiving a virtual machine migration announcement, in accordance with one or more aspects of the present disclosure. In the illustrative example of FIG. 3, switch 300 may associate (e.g., by an entry in a memory data structure) the data link layer address of virtual network interface 140A of virtual machine 170A and switch port 310E through which a migration announcement comprising the data link layer address of virtual network interface 140A has been received. In certain implementations, switch 300 may further associate (e.g., by an entry in a memory data structure) one or more VLANs associated with virtual network interface 140A of virtual machine 170A and switch port 310 through which a migration announcement comprising the data link layer address of virtual network interface 140A has been received.

Figure 4:
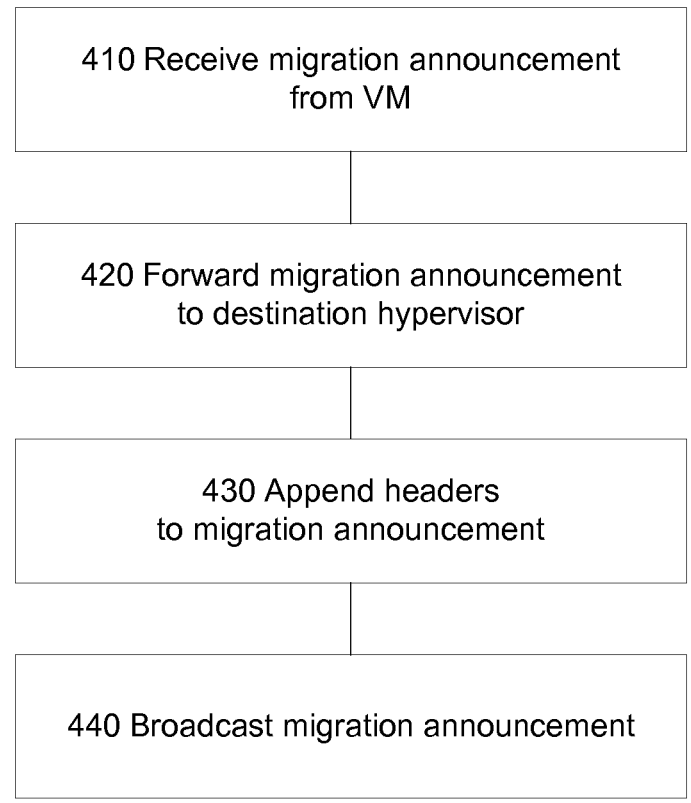
FIG. 4 depicts a flow diagram of an example method for announcing virtual machine migration, in accordance with one or more aspects of the present disclosure.

FIG. 4 depicts a flow diagram of an example method 400 for announcing virtual machine migration. Method 400 may be performed by a computer system that may comprise hardware (e.g., circuitry, dedicated logic, and/or programmable logic), software (e.g., instructions executable on a computer system to perform hardware simulation), or a combination thereof. Method 400 and/or each of its individual functions, routines, subroutines, or operations may be performed by one or more processors of the computer system executing the method (e.g., computer system 100A of FIG. 1). In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the origin hypervisor may receive a migration announcement transmitted by a virtual machine undergoing live migration. The migration announcement may comprise one or more data link layer addresses (e.g., Media Access Control (MAC) addresses) associated with one or more virtual network interfaces of the virtual machine. In certain implementations, the migration announcement may further comprise one or more VLAN identifiers associated with one or more virtual network interfaces of the virtual machine, as described in more details herein above.

At block 420, the origin hypervisor may forward the migration announcement to the destination hypervisor within a message transmitted over a network. In an illustrative example, the migration announcement may be stored in a memory location which is mapped into the address space of the virtual machine being migrated, and thus may be transmitted to the destination hypervisor as part of the virtual machine state transmission.

At block 430, the destination hypervisor may optionally append one or more data link layer and/or network layer headers to the body of the migration announcement that has been received from the origin hypervisor, as described in more details herein above.

At block 440, the destination hypervisor may broadcast the migration announcement over a network, as described in more details herein above. In an illustrative example, the migration announcement may be repeatedly broadcasted by the destination hypervisor to ensure that the announcement has been successfully received by all interested parties. In certain implementations, the migration announcement may be broadcasted by the destination hypervisor before the virtual machine is restarted at the destination host, as described in more details herein above. Responsive to completing operations described with reference to block 440, the method may terminate.

Figure 5:
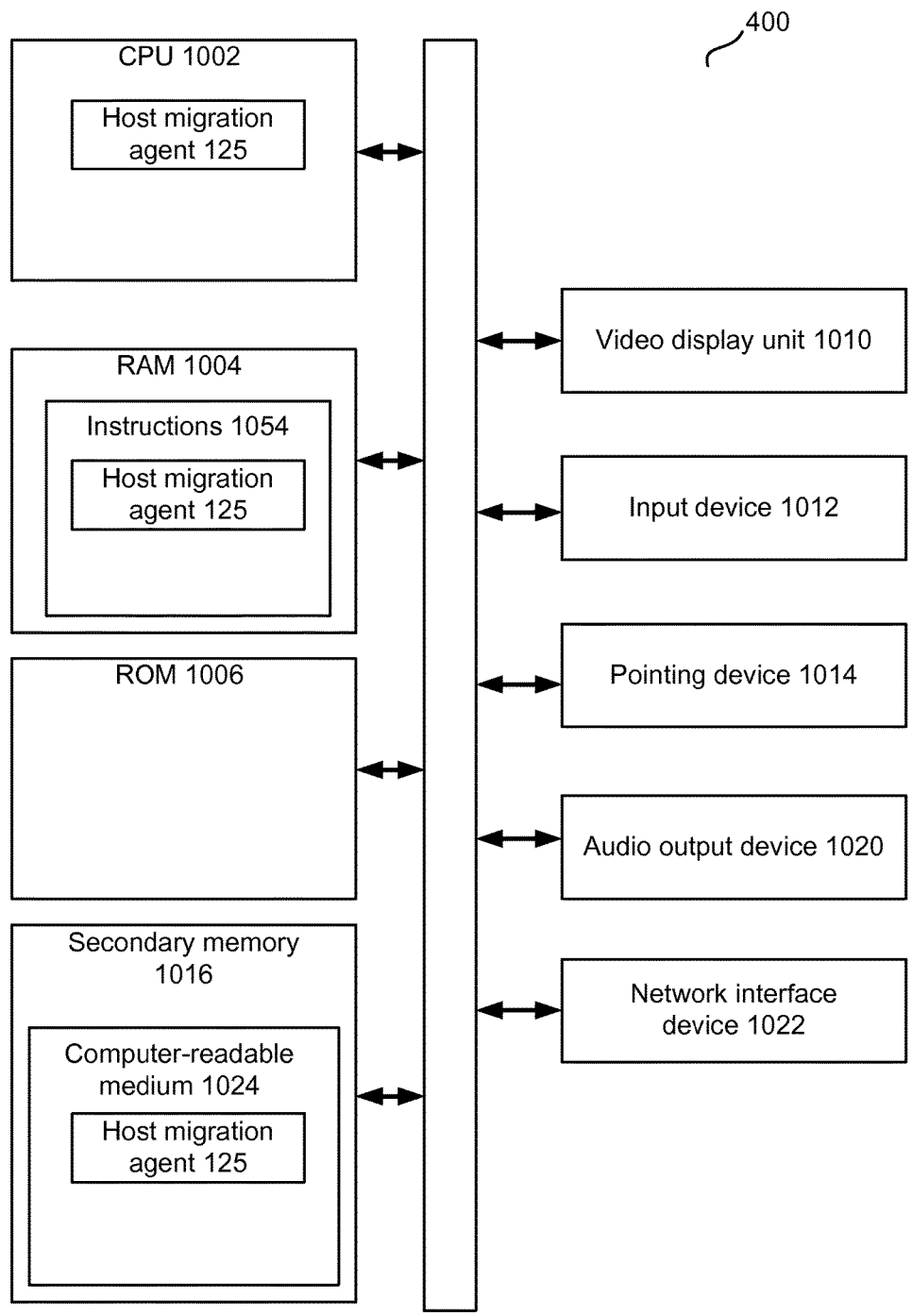
FIG. 5 depicts a block diagram of a computer system operating in accordance with one or more aspects of the present disclosure.

FIG. 5 depicts a block diagram of a computer system operating in accordance with one or more aspects of the present disclosure. In various illustrative examples, computer system 500 may correspond to example computer system 100 of FIG. 1.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

Processor 1002 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface controller 1022. Computer system 500 also may include a video display unit 1010 (e.g., an LCD), an alphanumeric input device 1012 (e.g., a keyboard), a pointing device 1014 (e.g., a mouse), and an audio output device 1020 (e.g., a speaker).

Secondary memory 1016 may include a non-transitory computer-readable storage medium 1024 on which may be stored instructions 1054 encoding any one or more of the methods or functions described herein, including instructions encoding host migration agent 125 of FIG. 1 implementing method 400 for announcing virtual machine migration.

Instructions 1054 may also reside, completely or partially, within main memory 1004 and/or within processor 1002 during execution thereof by computer system 500, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 400 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

The invention claimed is:

1. A method, comprising:
receiving, by a processing device executing a first hypervisor running on a first computer system, a migration announcement from a virtual machine that is undergoing live migration from the first computer system to a second computer system;
storing the migration announcement in a memory location mapped into an address space of the virtual machine;
transmitting, to a second hypervisor running on the second computer system, an execution state of the virtual machine, wherein the execution state comprises a memory state of the virtual machine including contents of the memory location storing the migration announcement received from the virtual machine, and wherein the migration announcement is transmitted to the second hypervisor as part of the execution state transmission;
receiving the migration announcement by the second hypervisor running on the second computer system; and
transmitting the migration announcement over a network before re-starting the virtual machine on the second computer system.

2. The method of claim 1, wherein transmitting the migration announcement comprises broadcasting the migration announcement to a plurality of recipients defined by a data link layer broadcast address.

3. The method of claim 1, wherein transmitting the migration announcement comprises appending, to the migration announcement, at least one of: a data link layer header or a network layer header.

4. The method of claim 1, wherein transmitting the migration announcement further comprises:
transmitting, by the second hypervisor, a Reverse Address Resolution Protocol (RARP) message comprising a source hardware address field specifying a data link layer address field of the virtual network interface of the virtual machine, a target hardware address field specifying the data link layer address field of the virtual network interface of the virtual machine, a source protocol address field specifying a network layer protocol address assigned to the virtual network interface of the virtual machine, and a target protocol address field specifying the network layer protocol address assigned to the virtual network interface of the virtual machine.

5. The method of claim 1, wherein transmitting the migration announcement further comprises:
transmitting, by the second hypervisor, a RARP message comprising an operation code field specifying a RARP "Request Reverse" message.

6. The method of claim 1, further comprising:
responsive to receiving the migration announcement, associating a data link layer address specified by the migration announcement with a virtual local area network (VLAN) identifier specified by the migration announcement.

7. The method of claim 1, further comprising:
responsive to receiving the migration announcement, associating a VLAN identifier specified by the migration announcement with a port through which the migration announcement has been received.

8. The method of claim 1, wherein the migration announcement comprises a VLAN identifier provided by a bit field inserted between source medium access control (MAC) address and EtherType/length fields of an Ethernet frame carrying the migration announcement.

9. The method of claim 1, wherein the migration announcement comprises a data link layer address associated with a virtual network interface of the virtual machine.

10. The method of claim 1, wherein the migration announcement comprises a VLAN identifier associated with a virtual network interface of the virtual machine.

11. The method of claim 1, wherein the execution state further comprises a virtual processor state of the virtual machine.

12. The method of claim 1, wherein the execution state further comprises a virtual device state of the virtual machine.

13. The method of claim 1, wherein the execution state further comprises a network state of the virtual machine. (VLAN) identifier associated with a virtual network interface of the virtual machine.

14. A computer system, comprising:
a memory; and
a processing device, operatively coupled to the memory, to:
receive, by a first hypervisor running on a first computer system, a migration announcement from a virtual machine that is undergoing live migration from the first computer system to a second computer system;
store the migration announcement in a memory location mapped into an address space of the virtual machine;
stop the virtual machine running on the first computer system; and
transmit, to a second hypervisor running on the second computer system, an execution state of the virtual machine, wherein the execution state comprises a memory state of the virtual machine including contents of the memory location storing the migration announcement received from the virtual machine, and wherein the migration announcement is transmitted to the second hypervisor as part of the execution state transmission.

15. The computer system of claim 14, wherein the migration announcement further comprises a data link layer address associated with a virtual network interface of the virtual machine.

16. The computer system of claim 14, wherein the migration announcement comprises a virtual local area network (VLAN) identifier associated with a virtual network interface of the virtual machine.

17. A computer-readable non-transitory storage medium comprising executable instructions that, when executed by a processing device executing a first hypervisor running on a first computer system, cause the processing device to:
receive a migration announcement from a virtual machine that is undergoing live migration from the first computer system to a second computer system;
store the migration announcement in a memory location mapped into an address space of the virtual machine;

stop the virtual machine running on the first computer system; and transmit, to a second hypervisor running on the second computer system, an execution state of the virtual machine, wherein the execution state comprises a memory state of the virtual machine including contents of the memory location storing the migration announcement received from the virtual machine, and wherein the migration announcement is transmitted to the second hypervisor as part of the execution state transmission.

18. The computer-readable non-transitory storage medium of claim 17, wherein the migration announcement further comprises a data link layer address associated with a virtual network interface of the virtual machine.

19. The computer-readable non-transitory storage medium of claim 17, wherein the migration announcement comprises a virtual local area network (VLAN) identifier associated with a virtual network interface of the virtual machine.

* * * * *